(12) United States Patent
Forstner et al.

(10) Patent No.: US 12,220,800 B2
(45) Date of Patent: Feb. 11, 2025

(54) HAND-HELD POWER TOOL

(71) Applicant: Hilti Aktiengesellschaft, Schaan (LI)

(72) Inventors: Markus Forstner, Landsberg (DE); Georg Braml, Landsberg (DE); Stefan Ringler, Schwabmuehlhausen (DE)

(73) Assignee: Hilti Aktiengesellschaft, Schaan (LI)

( * ) Notice: Subject to any disclaimer, the term of this patent is extended or adjusted under 35 U.S.C. 154(b) by 90 days.

(21) Appl. No.: 18/035,394

(22) PCT Filed: Nov. 9, 2021

(86) PCT No.: PCT/EP2021/081064
§ 371 (c)(1),
(2) Date: May 4, 2023

(87) PCT Pub. No.: WO2022/111988
PCT Pub. Date: Jun. 2, 2022

(65) Prior Publication Data
US 2024/0009824 A1   Jan. 11, 2024

(30) Foreign Application Priority Data
Nov. 27, 2020   (EP) ..................................... 20210255

(51) Int. Cl.
*B65D 17/00* (2006.01)
*B25D 17/00* (2006.01)
(Continued)

(52) U.S. Cl.
CPC ............... *B25D 17/00* (2013.01); *B25F 5/00* (2013.01); *H01H 9/06* (2013.01); *H02J 7/0042* (2013.01);
(Continued)

(58) Field of Classification Search
CPC ... B25D 17/00; B25F 5/00; H01H 9/06; H02J 7/0042; H02P 29/028
See application file for complete search history.

(56) References Cited

U.S. PATENT DOCUMENTS 7,275,978 B2 * 10/2007 Tagscherer ................ B25F 5/00
451/5
11,084,160 B2 * 8/2021 Draganis ................... B25F 5/02
(Continued)

FOREIGN PATENT DOCUMENTS

| DE | 212015000143 U1 | 1/2017 |
| EP | 3276821 A1 | 1/2018 |
| EP | 3427899 A1 | 1/2019 |

OTHER PUBLICATIONS

International Search Report of PCT/EP2021/081064 dated Feb. 18, 2022.

*Primary Examiner* — Thai T Dinh
(74) *Attorney, Agent, or Firm* — Davidson Kappel LLC

(57) ABSTRACT

A hand-held power tool, including: a drive circuit for providing an adjustment signal as a function of actuation of a button, a control apparatus for adjusting a drive current for an electric motor of the hand-held power tool as a function of the adjustment signal, wherein the control apparatus is connected to an electrical energy source for operating the hand-held power tool via a first electrical line arrangement, the drive circuit is connected to the control apparatus via a second electrical line arrangement, a drive current line carrying the drive current for the electric motor is routed via an interruption switch, coupled to the button, for interrupting the drive current, and wherein an interference-suppression capacitor is connected to the drive power line via a first node and to the second electrical line arrangement via a second node.

17 Claims, 2 Drawing Sheets

(51) Int. Cl.
*B25F 5/00* (2006.01)
*H01H 9/06* (2006.01)
*H02J 7/00* (2006.01)
*H02P 29/028* (2016.01)

(52) U.S. Cl.
CPC ...... *H02P 29/028* (2013.01); *B25D 2250/255* (2013.01)

(56) References Cited

U.S. PATENT DOCUMENTS

| | | | |
|---|---|---|---|
| 11,355,789 B2* | 6/2022 | Hauser | H02J 9/005 |
| 2013/0193891 A1* | 8/2013 | Wood | H02P 6/08 |
| | | | 318/434 |
| 2017/0190027 A1 | 7/2017 | Koizumi et al. | |
| 2018/0034388 A1 | 2/2018 | Kawai et al. | |

* cited by examiner

HAND-HELD POWER TOOL

The present invention relates to a hand-held power tool, in particular an electric hand-held power tool, such as an electric screwdriver for example.

BACKGROUND

Electrically operated hand-held power tools often have an electric motor that is supplied with energy from an electrical energy source. When the hand-held power tool is in operation, high-frequency interference voltages or interference currents can occur in the drive circuit. These can be short-circuited to ground, for example, with an interference-suppression capacitor in order to reduce or prevent the generation of electromagnetic interference signals.

SUMMARY OF THE INVENTION

In conventional hand-held power tools, the interference-suppression capacitor is, for reasons of space, integrated in the handle of the main switch, for example, and wired directly to the phase conductor, which carries the current for the electric motor, and to the neutral conductor. This requires a great deal of expenditure on cabling.

Against this background, it is an object of the present invention to propose a simplified hand-held power tool.

Accordingly, a hand-held power tool with a drive circuit for providing an adjustment signal as a function of actuation of a button and a control apparatus for adjusting a drive current for an electric motor of the hand-held power tool as a function of the adjustment signal is proposed. The control apparatus is connected to an electrical energy source for operating the hand-held power tool via a first electrical line arrangement, and the drive circuit is connected to the control apparatus via a second electrical line arrangement. A drive current line carrying the drive current for the electric motor is routed via an interruption switch, coupled to the button, for interrupting the drive current, wherein an interference-suppression capacitor is connected to the drive current line via a first node and to the second electrical line arrangement via a second node.

This hand-held power tool has the advantage that the expenditure on cabling is reduced in comparison to conventional solutions. Due to the connection of the interference-suppression capacitor via the second electrical line arrangement, a separate line that connects the interference-suppression capacitor to a neutral conductor of the electrical energy source can be dispensed with. This also eliminates the need for plugs or sockets which may be necessary for routing such a line through walls inside the housing.

The hand-held power tool can be designed as a mains-operated device which has to be connected to a power supply system during operation, or else as a device which is operated independent of the mains and is supplied with energy via a rechargeable battery, for example.

The hand-held power tool is designed, for example, as a drill, an impact drill, a hammer drill, a demolition hammer, a grinding machine, a cut-off grinder, a stirrer or a saw. This list is merely exemplary and is not to be understood as being exhaustive.

The button is designed, for example, as a trailing button that requires constant pressure in order to be actuated. The button can also be referred to as an on-off switch, as a main switch, as a torque controller or the like. The button is actuated by the user of the hand-held power tool in order to operate the hand-held power tool.

The drive circuit provides the adjustment signal as a function of actuation of the button. The adjustment signal can also be referred to as a target rotation speed value, rotation speed regulating signal, control signal or the like.

The adjustment signal can comprise a plurality of discrete stages and/or the adjustment signal can be continuous. The adjustment signal corresponds, for example, to a value of between 0% and 100% for the drive current. The adjustment signal is determined, in particular, as a function of a pressure exerted on the button. The button has, for example, a certain actuation path, for example the button can be depressed by up to 10 mm, wherein the adjustment signal is, for example, proportional to a current button position.

The control apparatus is connected to the electrical energy source via the first electrical line arrangement. For this purpose, the control apparatus comprises, in particular, a driver circuit. The electrical energy source is, for example, an electrical power supply system or a rechargeable battery. The first electrical line arrangement comprises at least two mutually insulated conductors, in particular a phase conductor and a neutral conductor. In addition, a protective conductor can be provided. The hand-held power tool is then also supplied with electrical energy via the first electrical line arrangement when the button is not actuated. In this way, for example, integrated circuits, display elements and/or other peripheral elements can be permanently supplied with power.

However, the electric motor of the hand-held power tool is only supplied with electrical energy when the button is actuated. In this case, the interruption switch serves as a safety device that completely interrupts the drive current as soon as the button is no longer actuated or falls below an actuation threshold value. The interruption switch is preferably mechanically coupled directly to the button. The drive power line is an additional power line that runs between the control apparatus and the interruption switch on the one hand and between the interruption switch and the electrical energy source on the other hand.

The level of the drive current is set by the control apparatus as a function of the adjustment signal. It can also be said that the control apparatus performs open-loop control or closed-loop control on the drive current. When the adjustment signal is 100%, the electric motor is supplied with the maximum electrical power. The electric motor then has, for example, the highest torque and/or the highest speed.

The interference-suppression capacitor is connected between the drive power line and the second electrical line arrangement. Here, the connection to the second electrical line arrangement can be made directly or via an interposed circuit, such as the drive circuit for example. The potential necessary for functioning of the interference-suppression capacitor can be looped through the drive circuit, for example, here.

According to one embodiment of the hand-held power tool, the interference-suppression capacitor is directly connected to the second electrical line arrangement.

"Directly connected" means, in particular, that no active or passive electrical component is arranged between the interference-suppression capacitor and the second electrical line arrangement. If the interference-suppression capacitor is connected to the second electrical line arrangement via a line looped through the drive circuit, this is likewise considered to be "directly connected".

In embodiments, the interference-suppression capacitor is directly connected to the second electrical line arrangement via a separate line. This embodiment excludes a connection via a looped-through line.

According to a further embodiment of the hand-held power tool, the interference-suppression capacitor is connected to a neutral conductor potential or to a ground potential via the second electrical line arrangement.

The neutral conductor potential relates, in particular, to a phase conductor potential of an electrical power supply system. The drive power line is correspondingly coupled to the phase conductor of the power supply system.

According to a further embodiment of the hand-held power tool, the interruption switch is connected to the control apparatus via a first section of the drive power line and is connected to the electrical energy source via a second section of the drive power line, wherein the interference-suppression capacitor is connected to the second section of the drive power line via the first node.

The interference-suppression capacitor is therefore coupled to the electrical energy source. This has the advantage that, when the interruption switch is opened, a charge stored in the interference-suppression capacitor can flow into the electrical energy source. Interference with or impairment or damage to elements in the hand-held power tool can therefore be avoided.

According to a further embodiment of the hand-held power tool, the interruption switch is opened or closed as a function of actuation of the button.

For example, the interruption switch is closed when the button is actuated by 10%-20%. In the case of a button with a 10 mm adjustment travel, this corresponds to actuation by 1 mm-2 mm.

According to a further embodiment of the hand-held power tool, the drive circuit, the button, the interference-suppression capacitor and the interruption switch are part of a common component.

The common component comprises, in particular, a common fastening unit, for example a mounting plate or the like.

In particular, the drive circuit, the interference-suppression capacitor and the interruption button can be arranged in a housing, wherein the button is arranged on the housing in such a way that it can be actuated from the outside. The housing can preferably have sockets or plugs, via which the second electrical line arrangement and the drive power line are routed into the housing.

According to a further embodiment of the hand-held power tool, the drive circuit comprises a circuit board on which at least one detection unit, coupled to the button, for detecting the actuation of the button is integrated.

The detection unit is configured, in particular, for detecting a current position of the button and for outputting the adjustment signal as a function of the detected current position.

The detection unit comprises, for example, a voltage divider which outputs an analog voltage signal as a function of an input voltage and the current position. In addition and/or as an alternative, the detection unit can comprise a digital converter which outputs the adjustment signal in the form of a duty cycle. In this case, the current position of the button can be detected optically or magnetically, for example.

According to a further embodiment of the hand-held power tool, the interference-suppression capacitor is integrated on the circuit board.

This further reduces the expenditure on cabling.

According to a further embodiment of the hand-held power tool, the interference-suppression capacitor is designed as an SMD component.

In this way, the circuit board can preferably be fully automatically populated, this further improving a production process for the hand-held power tool.

According to a further embodiment of the hand-held power tool, the drive circuit is integrated in a handle of the hand-held power tool and the button can be actuated from the outside of the handle.

In particular, the interruption switch and the interference-suppression capacitor are likewise arranged in the handle together with the drive circuit.

According to a further embodiment of the hand-held power tool, the control apparatus is configured to provide an operating voltage for the drive circuit via the second electrical line arrangement.

The drive circuit is operated, for example, with a low voltage which lies in a range of between 1 V and 20 V, for example.

According to a further embodiment of the hand-held power tool, the second electrical line arrangement comprises lines with a maximum cross section of 1 mm$^2$, preferably 0.5 mm$^2$, more preferably 0.33 mm$^2$.

Since only small currents are transmitted via the second electrical line arrangement, lines with a thin cross section can be used, this reducing the expenditure on materials.

According to a further embodiment of the hand-held power tool, the drive current line has a line cross section of between 1.5 mm$^2$ and 5 mm$^2$.

High currents and high powers can be transmitted via this line, this being advantageous for operating the electric motor in order to generate a high torque.

According to a further embodiment of the hand-held power tool, the interference-suppression capacitor has a capacitance of between 0.1 and 1 µF.

According to a further embodiment of the hand-held power tool, the interference-suppression capacitor is designed as a class X1 or a class X2 capacitor.

Class X1 capacitors are designed for voltage peaks of between 2500 and 4000 V and class X2 capacitors are designed for voltage peaks of up to 2500 V.

BRIEF DESCRIPTION OF THE FIGURES

The following description explains the invention with reference to exemplary embodiments and figures, in which.

Identical or functionally identical elements are indicated by the same reference signs in the figures, unless stated otherwise.

DETAILED DESCRIPTION

Figure 1:
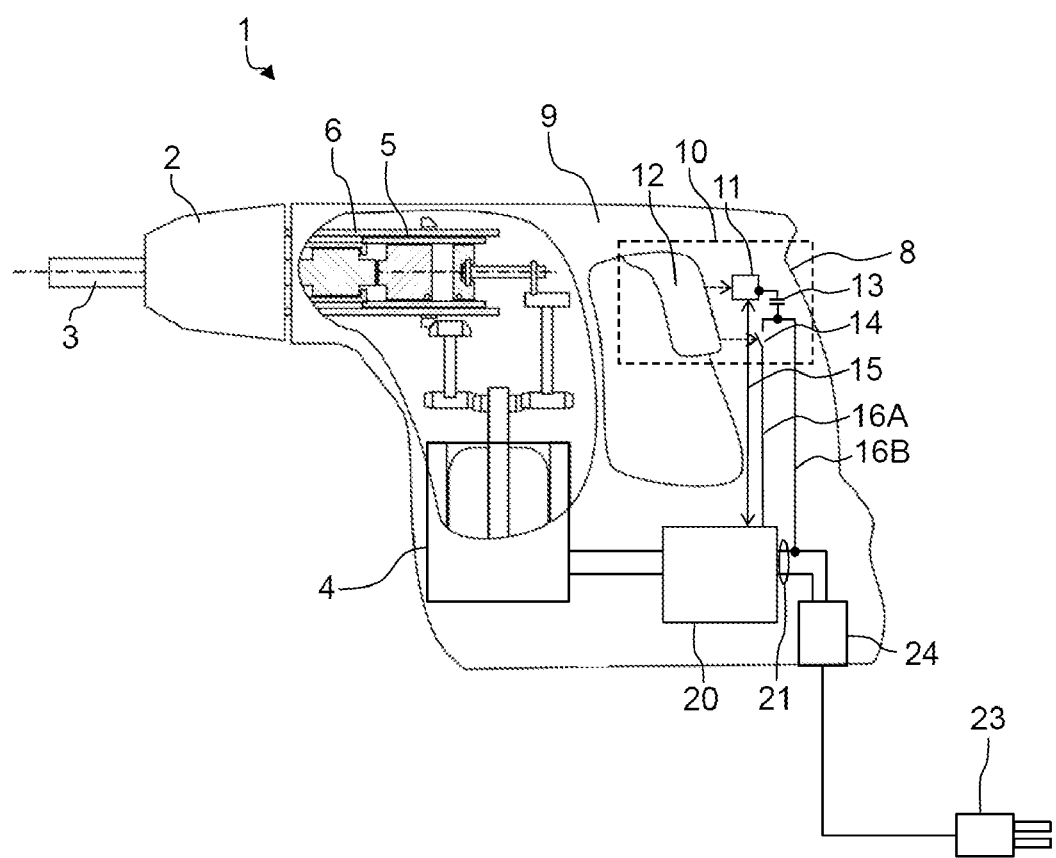
FIG. 1 shows a schematic view of a hand-held power tool.

FIG. 1 schematically shows a hand-held power tool 1, which is designed as a hammer drill in this example. The hammer drill 1 has a tool fitting 2 into which a drill bit 3 can be inserted as a tool. A primary drive of the hammer drill 1 forms an electric motor 4 which drives an impact mechanism 5 and a drive shaft 6. A user can guide the hammer drill 1 by means of a handle 8 and put the hammer drill 1 into operation by means of a button 12. During operation, the hammer drill 1 rotates the drill bit 3 continuously about a working axis and in so doing can hit the drill bit 3 along the working axis into a substrate.

An electrical arrangement 10, which fulfills various functions, is arranged in the handle 8. A drive circuit 11 is configured to provide an adjustment signal SIG (see FIG. 2) as a function of actuation of the button 12. For this purpose, the drive circuit 11 is coupled to a control apparatus 20 by means of the second electrical line arrangement 15. In particular, the adjustment signal SIG is transmitted via the second electrical line arrangement 15. The drive circuit 11 provides the adjustment signal SIG as a function of a current position of the button 12, which is designed in particular as a trailing button. The combination of the button 12 and the drive circuit 11 can also be referred to as a rotation speed controller. The electrical arrangement 10 further comprises an interruption switch 14 which is arranged in a drive current line 16A, 16B which carries the drive current for the electric motor 4. The interruption switch 14 is coupled to the button 12 and is opened or closed as a function of actuation of the button 12. The interruption switch 14 ensures that the electric motor 4 is only supplied with power when the button 12 is actuated. In addition, the arrangement 10 comprises an interference-suppression capacitor 13 which is connected at one end to the drive power line 16A, 16B and at the other end to the second electrical line arrangement 15. In this example, the connection to the second electrical line arrangement 15 is implemented via the drive circuit 11.

The tool fitting 2 has a sleeve into which one end of the drill bit 3 can be inserted. The torque is provided by the electric motor 4 and passed on to the sleeve via a drive train. The drive train includes, for example, the output shaft 6 and a transmission between the motor 4 and the drive shaft 6. The transmission can adapt, for example, a rotation speed of the motor 4 to a desired rotation speed of the drill bit 3.

The rotation speed and/or the torque of the electric motor 4 is adjusted by a control apparatus 20 as a function of the adjustment signal SIG. It can also be said that the control apparatus 20 controls the electric motor and/or regulates it to a target value. The control apparatus 20 is coupled via a first electrical line arrangement 21 to a connection terminal 24 which can be coupled to a power supply system by means of a plug 23. As an alternative, the hammer drill 1 can also be supplied with power via a rechargeable battery. Power consumption by the electric motor 4 during operation, the operating value, preferably corresponds approximately to the rated power of the electric motor 4, as a result of which an optimal ratio of power and weight is obtained. The electric motor 4 is, in particular, a mechanically commutating universal motor and/or an electronically commutating motor.

Figure 2:
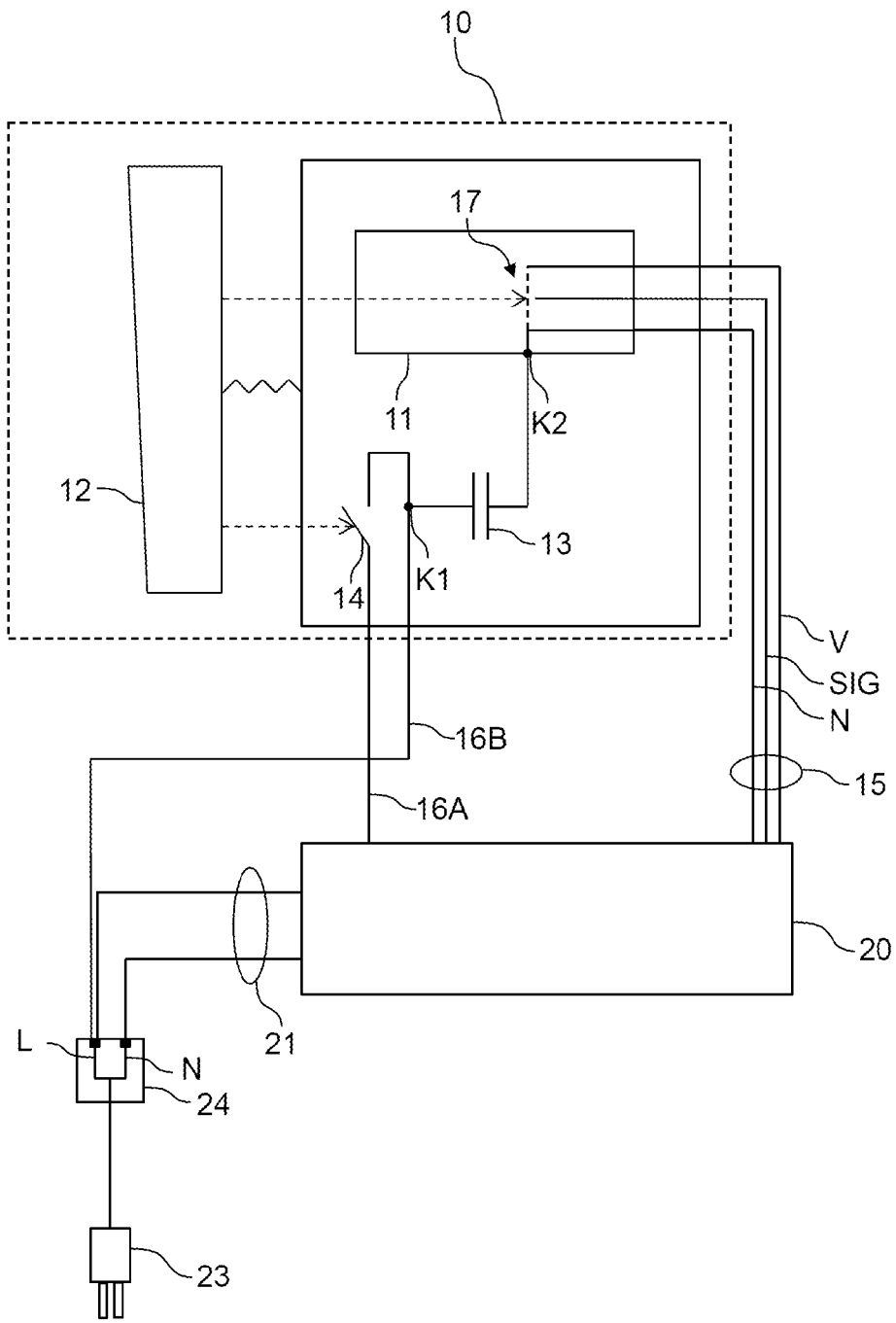
FIG. 2 shows a schematic view of internal wiring of a hand-held power tool.

FIG. 2 shows a schematic view of an exemplary embodiment of the internal wiring of a hand-held power tool 1, for example the hammer drill 1 from FIG. 1. It is, for example, a mains-operated hand-held power tool 1 which can be connected to a power supply system via a plug 23. In this example, a phase conductor L and a neutral conductor N are provided via a connection terminal 24, which is arranged in particular in a housing 9 (see FIG. 1) of the hand-held power tool 1.

A control apparatus 20 is connected to the connection terminal 24 and the two phases L, N of the power supply system via a first electrical line arrangement 21. The control apparatus 20 can therefore be supplied with electrical energy as soon as the plug 23 is coupled to the power supply system. The first electrical line arrangement 21 comprises lines with a cross section of up to 5 mm². The control apparatus 20 comprises, for example, a transformer which is configured to generate and provide a low voltage. The low voltage is, for example, one or more voltage values of between 1 V and 20 V. For example, integrated components, such as a control unit (ASIC: application specific integrated circuit, PLC: programmable logic controller, CPU: central processing unit), memory units (ROM: read only memory, RAM: random access memory), display apparatuses (LCD: liquid crystal display), lighting devices (LED: light emitting diode) and the like, can be operated with the low voltage.

In particular, a drive circuit 11 is connected to the control apparatus 20 via a second electrical line arrangement 15 and is fed with the low voltage via this. In this example, the second electrical line arrangement 15 comprises three separate lines N, V and SIG, wherein the lines N and V correspond to the poles of the low voltage and the adjustment signal SIG is transmitted via the third line. In this example, the low voltage relates to the neutral conductor potential of the power supply system, but this does not necessarily have to be the case. In embodiments, yet further lines can be provided, for example in order to provide additional potentials. The drive circuit 11 is coupled to a button 12 and is configured to provide the adjustment signal SIG as a function of actuation of the button 12. For this purpose, the drive circuit 11 comprises, in particular, a detection unit 17 which, in this example, is designed as a voltage converter. The lines N, V, SIG of the second electrical line arrangement 15 have, for example, a line cross section of 0.33 mm².

The button 12 is further coupled to an interruption switch 14. When the button 12 is actuated, for example depressed by 10%, the interruption switch 14 closes. The interruption switch 14 is connected to the control apparatus 20 via a first section 16A of the drive power line and is connected to the connection terminal 24 and the phase conductor L of the power supply system via a second section 16B of the drive power line. The drive power line 16A, 16B has a cross section of 3 mm². An interference-suppression capacitor 13 is connected via a first node K1 to the second section 16B of the drive power line and the interference-suppression capacitor 13 is connected to the second electrical line arrangement 15, in this example to the neutral conductor potential N which is looped through the drive circuit 11, via a second node K2. The interference-suppression capacitor 13, which has a capacitance of 0.22 µF and can withstand a peak voltage of 4000 V (class X1), is therefore configured to filter high-frequency voltage fluctuations which can occur during operation of the electric motor 4 (see FIG. 1).

The drive circuit 11, the button 12, the interference-suppression capacitor 13 and the interruption switch 14 preferably form a common component 10. In preferred embodiments, the drive circuit 11 is designed as a circuit board, wherein the interference-suppression capacitor 13 is integrated on the circuit board, preferably as an SMD component (SMD: surface-mounted device). The drive circuit 11 can have further electronic components or can be configured for their operation, such as an LED, a torque sensor, an acceleration sensor, a temperature sensor and the like, for example.

LIST OF REFERENCE SIGNS

1 Hand-held power tool (hammer drill)
2 Tool fitting
3 Tool
4 Motor
5 Impact mechanism
6 Drive shaft 7 Rechargeable battery
8 Handle
9 Housing
10 Arrangement
11 Drive circuit
12 Button
13 Interference-suppression capacitor
14 Interruption switch
15 Second electrical line arrangement
16A Section
16B Section
17 Voltage divider
20 Control apparatus
21 First electrical line arrangement
23 Plug
24 Connection terminal
K1 Node
K2 Node
L Phase conductor
N Neutral conductor
SIG Adjustment signal
V Low voltage potential

What is claimed is:

1. A hand-held power tool comprising:
a drive circuit for providing an adjustment signal as a function of actuation of a button;
a controller for adjusting a drive current for an electric motor of the hand-held power tool as a function of the adjustment signal, the controller being connected to an electrical energy source for operating the hand-held power tool via a first electrical line arrangement, the drive circuit being connected to the controller via a second electrical line arrangement;
a drive current line carrying the drive current for the electric motor being routed via an interruption switch, coupled to the button, for interrupting the drive current; and
an interference-suppression capacitor being connected to the drive power line via a first node and to the second electrical line arrangement via a second node.

2. The hand-held power tool as recited in claim 1 wherein the interference-suppression capacitor is directly connected to the second electrical line arrangement.

3. The hand-held power tool as recited in claim 1 wherein the interference-suppression capacitor is connected to a neutral conductor potential or to a ground potential via the second electrical line arrangement.

4. The hand-held power tool as recited in claim 1 wherein the interruption switch is connected to the controller via a first section of the drive power line and is connected to the electrical energy source via a second section of the drive power line, wherein the interference-suppression capacitor is connected to the second section of the drive power line via the first node.

5. The hand-held power tool as recited in claim 1 wherein the interruption switch is opened or closed as a function of actuation of the button.

6. The hand-held power tool as recited in claim 1 wherein the drive circuit, the button, the interference-suppression capacitor and the interruption switch are part of a common component.

7. The hand-held power tool as recited in claim 1 wherein the drive circuit includes a circuit board on which at least one detector, coupled to the button, for detecting the actuation of the button is integrated.

8. The hand-held power tool as recited in claim 7 wherein the interference-suppression capacitor is integrated on the circuit board.

9. The hand-held power tool as recited in claim 8 wherein the interference-suppression capacitor is designed as an SMD component.

10. The hand-held power tool as recited in claim 1 wherein the drive circuit is integrated in a handle of the hand-held power tool and the button is actuatable from the outside of the handle.

11. The hand-held power tool as recited in claim 1 wherein the controller is configured to provide an operating voltage for the drive circuit via the second electrical line arrangement.

12. The hand-held power tool as recited in claim 1 wherein the second electrical line arrangement has lines with a maximum cross section of 1 mm$^2$.

13. The hand-held power tool as recited in claim 12 wherein the second electrical line arrangement has lines with a maximum cross section of 0.5 mm$^2$.

14. The hand-held power tool as recited in claim 13 wherein the second electrical line arrangement has lines with a maximum cross section of 0.33 mm$^2$.

15. The hand-held power tool as recited in claim 1 wherein the drive current line has a line cross section of between 1.5 mm$^2$ and 5 mm$^2$.

16. The hand-held power tool as recited in claim 1 wherein the interference-suppression capacitor has a capacitance of between 0.1 and 1 µF.

17. The hand-held power tool as recited in claim 1 wherein the interference-suppression capacitor is designed as a class X1 or a class X2 capacitor.

* * * * *